US012574237B2

(12) United States Patent
Renes et al.

(10) Patent No.: US 12,574,237 B2
(45) Date of Patent: Mar. 10, 2026

(54) NUMBER THEORETIC TRANSFORM WITH PARALLEL COEFFICIENT PROCESSING

(71) Applicant: NXP B.V., Eindhoven (NL)

(72) Inventors: Joost Roland Renes, Eindhoven (NL); Björn Fay, Brande-Hörnerkirchen (DE)

(73) Assignee: NXP B.V., Eindhoven (NL)

( * ) Notice: Subject to any disclaimer, the term of this patent is extended or adjusted under 35 U.S.C. 154(b) by 264 days.

(21) Appl. No.: 18/132,274

(22) Filed: Apr. 7, 2023

(65) Prior Publication Data

US 2024/0348441 A1 Oct. 17, 2024

(51) Int. Cl.
*H04L 9/30* (2006.01)
*G06F 17/14* (2006.01)

(52) U.S. Cl.
CPC ............ *H04L 9/3093* (2013.01); *G06F 17/14* (2013.01); *H04L 2209/125* (2013.01)

(58) Field of Classification Search
CPC .. H04L 9/3093; H04L 2209/125; G06F 17/14
See application file for complete search history.

(56) References Cited

U.S. PATENT DOCUMENTS

| | | | |
|---|---|---|---|
| 8,938,034 B2 | 1/2015 | Alaus et al. | |
| 11,206,136 B1 | 12/2021 | Renes et al. | |
| 11,265,163 B2 * | 3/2022 | Poeppelmann | ....... H04L 9/0662 |
| 11,798,435 B2 * | 10/2023 | Poeppelmann | .......... G09C 1/00 |
| 11,847,938 B2 * | 12/2023 | Renes | ..................... G06F 7/722 |
| 11,922,135 B2 * | 3/2024 | Yonemura | ............... G06F 7/725 |

| | | | |
|---|---|---|---|
| 2004/0039928 A1 * | 2/2004 | Elbe | ......................... G06F 7/72 |
| | | | 713/189 |
| 2010/0064142 A1 * | 3/2010 | Matsuzaki | .............. G06F 7/728 |
| | | | 713/189 |
| 2015/0006604 A1 * | 1/2015 | Ng | ........................ G06F 17/142 |
| | | | 708/404 |
| 2016/0292127 A1 * | 10/2016 | Lingam | ................. G06F 9/3877 |

(Continued)

FOREIGN PATENT DOCUMENTS

| | | |
|---|---|---|
| CN | 104065478 A | 9/2014 |
| FR | 3010556 A1 | 3/2015 |

(Continued)

OTHER PUBLICATIONS

Alkim, Erdem et al.: "Compact and Simple RLWE Based Key Encapsulation Mechanism"; Sep. 9, 2019; Advances In Databases And Information Systems; Lecture Notes In Computer Science; ISBN: 978-3-319-10403-4; pp. 237-256.

(Continued)

*Primary Examiner* — Lynn D Feild
*Assistant Examiner* — Abdullah Almamun

(57) ABSTRACT

Electronic device and method for performing number theoretic transforms (NTTs) on polynomials for cryptography uses an arithmetic transformation on an input polynomial with n coefficients to divide the input polynomial into multiple polynomials each with less than n coefficients such that the coefficients of the multiple polynomials add up to n. An NTT transformation is executed on the multiple polynomials such that the coefficients of each of the multiple polynomials are processed in parallel butterfly operations. A cryptographic operation is performed based on the results of the NTT transformation.

20 Claims, 6 Drawing Sheets

(56)                    References Cited

U.S. PATENT DOCUMENTS

| | | | | |
|---|---|---|---|---|
| 2018/0294950 A1* | 10/2018 | Khedr | ..................... | H04L 9/008 |
| 2020/0265167 A1* | 8/2020 | Banerjee | ............... | H04L 9/0631 |
| 2022/0006611 A1 | 1/2022 | Ghosh et al. | | |
| 2022/0417019 A1* | 12/2022 | Ghosh | ................... | H04L 9/0825 |
| 2023/0171084 A1* | 6/2023 | Kwon | ................... | H04L 9/3093 |
| | | | | 380/28 |
| 2023/0188322 A1* | 6/2023 | Bajpeyi | ................... | H04L 9/008 |
| 2023/0269067 A1* | 8/2023 | Son | ......................... | H04L 9/008 |
| | | | | 380/28 |
| 2023/0318829 A1* | 10/2023 | Sim | ....................... | H04L 9/0852 |
| 2024/0267212 A1* | 8/2024 | Ghosh | .................. | H04L 9/3093 |
| 2025/0080334 A1* | 3/2025 | Saarinen | .............. | H04L 9/0897 |

FOREIGN PATENT DOCUMENTS

| | | | | |
|---|---|---|---|---|
| FR | 3083890 A1 | 1/2020 | | |
| KR | 20220047797 A | * | 4/2022 | ........... H04L 9/0897 |

OTHER PUBLICATIONS

Cooley, J. et al. "An algorithm for the machine calculation of complex Fourier series", Research in part at Princeton University under the sponsorship of the Army Research Office (Durham), pp. 297-301.

Pollard, J.M. "The fast Fourier transform in a finite field" Mathematics of Computation, vol. 25, No. 114, Apr. 1971, 10 pages.

Regev, Oded, "On lattices, learning with errors, random linear, and cryptography", Random Linear Codes, and Cryptography, May 2, 2009, 37 pages.

Yubashevsky, Vadim et al "On ideal lattices and learning with errors over rings" International Association for Cryptologic Research 2010, H. Gilbert (Ed.): Eurocrypt 2010, LNCS 6110, (2010), pp. 1-23.

Seiler, Gregor, "Faster AVX2 optimized NTT multiplication for Ring-LWE lattice cryptography" IBM Research Zurich, 2018, 14 pages.

Chung, Chi-Ming Marvin et al "NTT Multiplication for NTT-unfriendly Rings: New Speed Records for Saber and NTRU on Cortex-M4 and AVX2", IACR Transactions on Cryptographic Hardware and Embedded Systems, ISSN 2569-2925, vol. 2021, No. 2, pp. 159-188.

Duong-Ngoc, Phap et al. "Efficient k-Parallel Pipelined NTT Architecture for Post Quantum Cryptography", 2020 International SoC Design Conference (ISOCC) (2020), pp. 212-213.

Duong-Ngoc, Phap et al., "Efficient NewHope Cryptography Based Facial Security System on a GPU", IEEE Access, (2020), 11 pgs.

National Institute of Standards and Technology, Post-quantum cryptography standardization, https://csrc.nist.gov/Projects/Post-Quantum-Cryptography/, downloaded Oct. 24, 2023, 4 pgs.

* cited by examiner

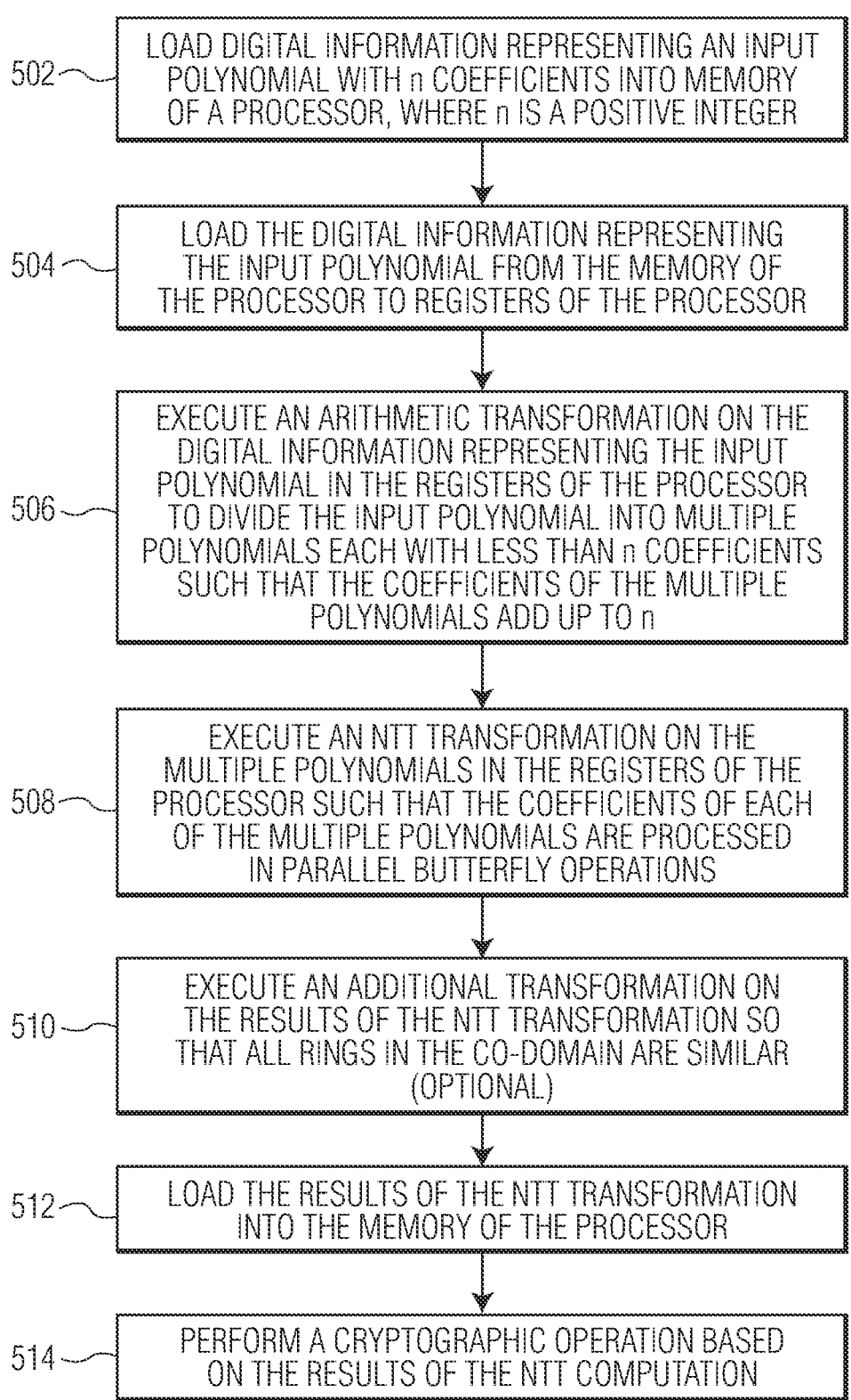

502 — LOAD DIGITAL INFORMATION REPRESENTING AN INPUT POLYNOMIAL WITH n COEFFICIENTS INTO MEMORY OF A PROCESSOR, WHERE n IS A POSITIVE INTEGER

504 — LOAD THE DIGITAL INFORMATION REPRESENTING THE INPUT POLYNOMIAL FROM THE MEMORY OF THE PROCESSOR TO REGISTERS OF THE PROCESSOR

506 — EXECUTE AN ARITHMETIC TRANSFORMATION ON THE DIGITAL INFORMATION REPRESENTING THE INPUT POLYNOMIAL IN THE REGISTERS OF THE PROCESSOR TO DIVIDE THE INPUT POLYNOMIAL INTO MULTIPLE POLYNOMIALS EACH WITH LESS THAN n COEFFICIENTS SUCH THAT THE COEFFICIENTS OF THE MULTIPLE POLYNOMIALS ADD UP TO n

508 — EXECUTE AN NTT TRANSFORMATION ON THE MULTIPLE POLYNOMIALS IN THE REGISTERS OF THE PROCESSOR SUCH THAT THE COEFFICIENTS OF EACH OF THE MULTIPLE POLYNOMIALS ARE PROCESSED IN PARALLEL BUTTERFLY OPERATIONS

510 — EXECUTE AN ADDITIONAL TRANSFORMATION ON THE RESULTS OF THE NTT TRANSFORMATION SO THAT ALL RINGS IN THE CO-DOMAIN ARE SIMILAR (OPTIONAL)

512 — LOAD THE RESULTS OF THE NTT TRANSFORMATION INTO THE MEMORY OF THE PROCESSOR

514 — PERFORM A CRYPTOGRAPHIC OPERATION BASED ON THE RESULTS OF THE NTT COMPUTATION

FIG. 5

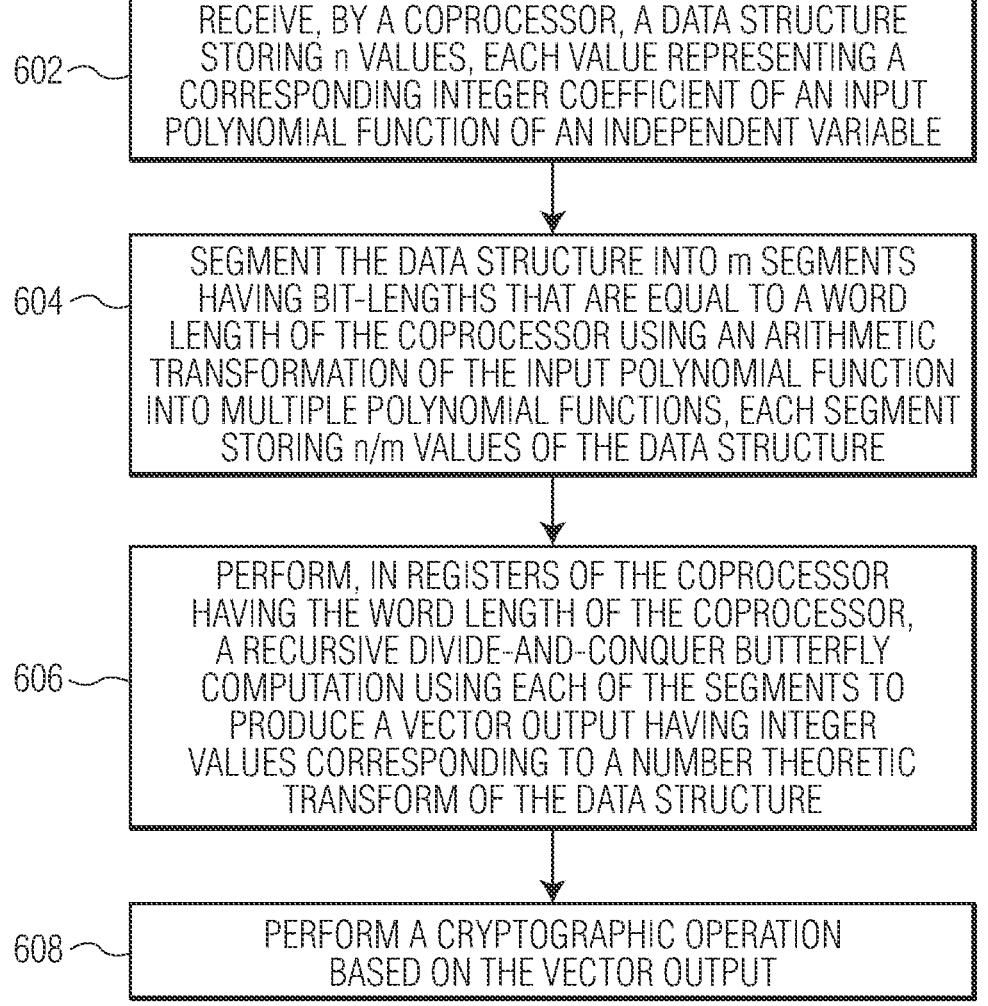

602 — RECEIVE, BY A COPROCESSOR, A DATA STRUCTURE STORING n VALUES, EACH VALUE REPRESENTING A CORRESPONDING INTEGER COEFFICIENT OF AN INPUT POLYNOMIAL FUNCTION OF AN INDEPENDENT VARIABLE

604 — SEGMENT THE DATA STRUCTURE INTO m SEGMENTS HAVING BIT-LENGTHS THAT ARE EQUAL TO A WORD LENGTH OF THE COPROCESSOR USING AN ARITHMETIC TRANSFORMATION OF THE INPUT POLYNOMIAL FUNCTION INTO MULTIPLE POLYNOMIAL FUNCTIONS, EACH SEGMENT STORING n/m VALUES OF THE DATA STRUCTURE

606 — PERFORM, IN REGISTERS OF THE COPROCESSOR HAVING THE WORD LENGTH OF THE COPROCESSOR, A RECURSIVE DIVIDE-AND-CONQUER BUTTERFLY COMPUTATION USING EACH OF THE SEGMENTS TO PRODUCE A VECTOR OUTPUT HAVING INTEGER VALUES CORRESPONDING TO A NUMBER THEORETIC TRANSFORM OF THE DATA STRUCTURE

608 — PERFORM A CRYPTOGRAPHIC OPERATION BASED ON THE VECTOR OUTPUT

FIG. 6

NUMBER THEORETIC TRANSFORM WITH PARALLEL COEFFICIENT PROCESSING

BACKGROUND

Recent significant advances in quantum computing have accelerated the research into post-quantum cryptography schemes for cryptographic algorithms, which run on classical computers but are believed to be still secure even when faced against an adversary with access to a quantum computer. This demand is driven by interest from standardization bodies, such as the call for proposals for new public-key cryptography standards by the National Institute of Standards and Technology (NIST).

There are various different families of problems to instantiate these post-quantum cryptographic approaches. Constructions based on the hardness of lattice problems are considered to be one of the most promising candidates to become the next standard. Most approaches considered within this family are a generalization of the Learning With Errors (LWE) framework, i.e., the Ring-Learning With Errors problem.

When implemented, the main computationally expensive operations are arithmetic with polynomials with integer coefficients. These computations can be done in a ring $R_q = \mathbb{F}_q[X]/(X^n+1)$ for positive integers q and n, where the coefficients of the polynomial are in $\mathbb{F}_q$ while the polynomial arithmetic is modulo $X^n+1$. In contrast to other popular classical public-key cryptography where arithmetic of large integers of hundreds or thousands of bits is needed, the value of q is much smaller (less than 32 bits). As a result, it is unclear how to use the hardware accelerators developed and deployed for classical public-key cryptography in executing these computations.

SUMMARY

Electronic device and method for performing number theoretic transforms (NTTs) on polynomials for cryptography uses an arithmetic transformation on an input polynomial with n coefficients to divide the input polynomial into multiple polynomials each with less than n coefficients such that the coefficients of the multiple polynomials add up to n. An NTT transformation is executed on the multiple polynomials such that the coefficients of each of the multiple polynomials are processed in parallel butterfly operations. A cryptographic operation is performed based on the results of the NTT transformation.

In an embodiment, a computer-implemented method for performing NTTs on polynomials for cryptography comprises receiving, by a coprocessor, a data structure storing n values, each value representing a corresponding integer coefficient of an input polynomial function of an independent variable, segmenting the data structure into m segments having bit-lengths that are equal to a word length of the coprocessor using an arithmetic transformation of the input polynomial function into multiple polynomial functions, each segment storing n/m values of the data structure, performing, in registers of the coprocessor having the word length of the coprocessor, a recursive divide-and-conquer butterfly computation using each of the segments to produce a vector output having integer values corresponding to a number theoretic transform of the data structure, and performing a cryptographic operation based on the vector output.

In an embodiment, the number of the multiple polynomial functions is n/m, where n is the number of coefficients for each of the multiple polynomial functions.

In an embodiment, m equals w divided by 2l, where l is the smallest power of two larger than log q and q is a prime number.

In an embodiment, the input polynomial function is $f = \Sigma_{i=0}^n f_i X^i$ in a ring $R_q = F_q[X]/(X^n+1)$.

In an embodiment, the coefficients of each of the multiple polynomial functions fit in a w-bit register of the coprocessor.

In an embodiment, the input polynomial function includes a variable X and wherein the arithmetic transformation includes replacing $X^m$ in the input polynomial function with a variable Y.

In an embodiment, performing the recursive divide-and-conquer butterfly computation includes executing the following transformation:

$$F(X, Y) \mapsto (F(X, \zeta), F(X, \zeta^3) \ldots , F(X, \zeta^{\frac{2n}{m}-1})),$$

where $\zeta$ is a root of unity for F(X, Y).

In an embodiment, the method further comprises executing a transformation on the vector output to convert the vector output to Gentleman-Sande style NTT results.

In an embodiment, a non-transitory computer-readable storage medium containing program instructions for performing number theoretic transforms (NTTs) on polynomials for cryptography, wherein execution of the program instructions by one or more processors of a computer causes the one or more processors to perform steps that comprise receiving, by a coprocessor, a data structure storing n values, each value representing a corresponding integer coefficient of an input polynomial function of an independent variable, segmenting the data structure into m segments having bit-lengths that are equal to a word length of the coprocessor using an arithmetic transformation of the input polynomial function into multiple polynomial functions, each segment storing n/m values of the data structure, performing, in registers of the coprocessor having the word length of the coprocessor, a recursive divide-and-conquer butterfly computation using each of the segments to produce a vector output having integer values corresponding to a number theoretic transform of the data structure, and performing a cryptographic operation based on the vector output.

In an embodiment, the number of the multiple polynomial functions is n/m, where n is the number of coefficients for each of the multiple polynomial functions.

In an embodiment, m equals w divided by 2l, where l is the smallest power of two larger than log q and q is a prime number.

In an embodiment, the input polynomial function is $f = \Sigma_{i=0}^n f_i X^i$ in a ring $R_q = F_q[X]/(X^n+1)$.

In an embodiment, the coefficients of each of the multiple polynomial functions fit in a w-bit register of the coprocessor.

In an embodiment, the input polynomial function includes a variable X and wherein the arithmetic transformation includes replacing $X^m$ in the input polynomial function with a variable Y.

In an embodiment, performing the recursive divide-and-conquer butterfly computation includes executing the following transformation:

$$F(X, Y) \mapsto (F(X, \zeta), F(X, \zeta^3) \ldots, F(X, \zeta^{\frac{2n}{m}-1})),$$

where $\zeta$ is a root of unity for $F(X, Y)$.

In an embodiment, the steps further comprise executing a transformation on the vector output to convert the vector output to Gentleman-Sande style NTT results.

In an embodiment, an electronic device comprises memory; and at least one processor, including a coprocessor, configured to receive, by the coprocessor, a data structure storing n values, each value representing a corresponding integer coefficient of an input polynomial function of an independent variable, segment the data structure into m segments having bit-lengths that are equal to a word length of the coprocessor using an arithmetic transformation of the input polynomial function into multiple polynomial functions, each segment storing n/m values of the data structure, perform, in registers of the coprocessor having the word length of the coprocessor, a recursive divide-and-conquer butterfly computation using each of the segments to produce a vector output having integer values corresponding to a number theoretic transform of the data structure, and perform a cryptographic operation based on the vector output.

In an embodiment, the number of the multiple polynomial functions is n/m, where n is the number of coefficients for each of the multiple polynomial functions.

In an embodiment, m equal w divided by 2l, where l is the smallest power of two larger than log q and q is a prime number.

In an embodiment, the input polynomial function is $f = \Sigma_{i=0}^{n} f_i X^i$ in a ring $R_q = F_q[X]/(X^n+1)$.

These and other aspects in accordance with embodiments will become apparent from the following detailed description, taken in conjunction with the accompanying drawings, illustrated by way of example of the principles of the embodiments.

BRIEF DESCRIPTION OF THE DRAWINGS

FIG. 5 is a flow diagram of a process for performing an NTT on an input polynomial in accordance with an embodiment of the invention.

FIG. 6 is a process flow diagram of a computer-implemented method for performing NTTs on polynomials for cryptography in accordance with an embodiment of the invention.

Throughout the description, similar reference numbers may be used to identify similar elements.

DETAILED DESCRIPTION

Figure 1:
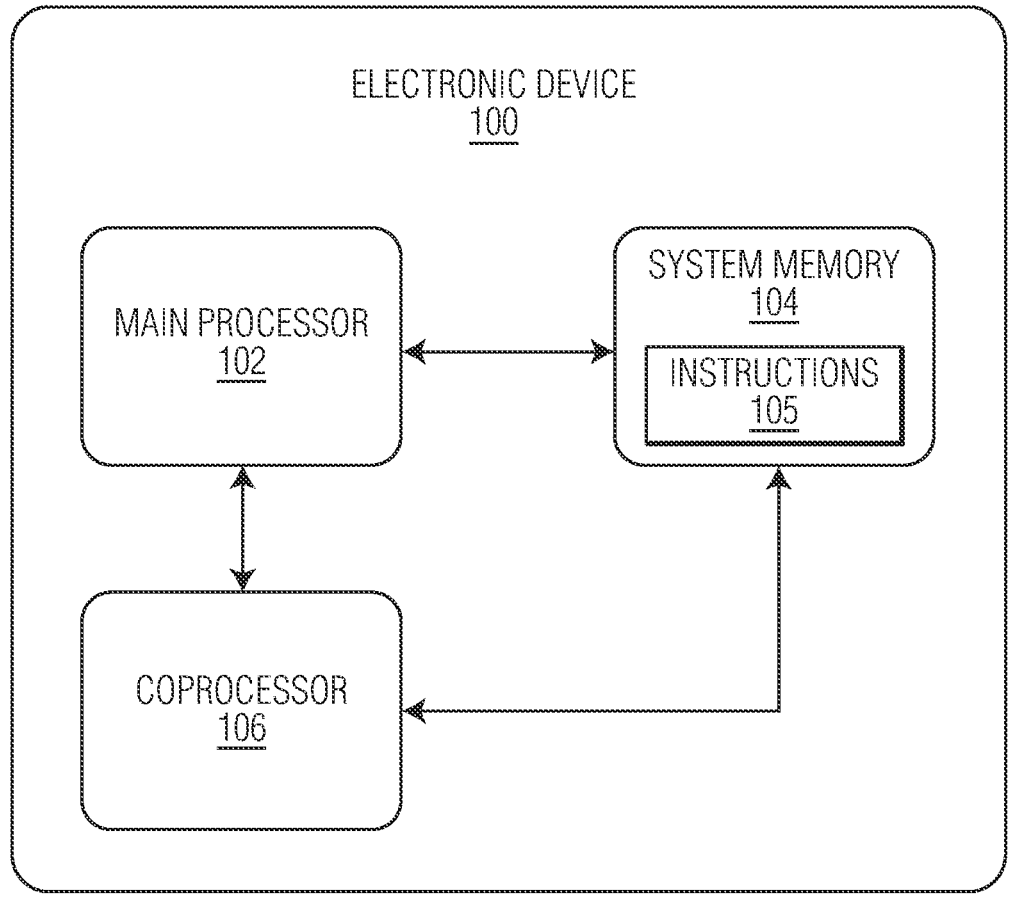
FIG. 1 is a block diagram of an electronic device in which embodiments of the invention can be implemented.

It will be readily understood that the components of the embodiments as generally described herein and illustrated in the appended FIGS. could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the embodiments is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Lattice-based cryptography is a promising direction for the new post-quantum cryptography standard. The main arithmetic operations used for lattice-based cryptography consist of polynomial multiplication in the ring $F_q[X]/(X^n+1)$, where typically $q < 2^{32}$ and n=256. This makes it hard to directly apply the existing fast and hardened arithmetic coprocessors designed for classical public-key cryptography, such as Elliptic Curve Cryptography (ECC) and Rivest-Shamir-Adleman (RSA) cryptography. As described below, cryptography computations in accordance with embodiments of the invention can make use of the existing coprocessors efficiently in order to parallelize number theoretic transform (NTT) operations, which results in significantly faster implementations.

Although NTTs come in various shapes and forms, the focus of embodiments of the invention is on the setting where the coefficient ring is a finite field $\mathbb{F}_q$ of prime order q and polynomials are taken modulo $X^n+1$ for some n such that $2n|q-1$ (i.e., 2n divides (q−1)). That is, the embodiments work in the ring $R_q = F_q[X]/(X^n+1)$. Let $\zeta$ be a 2n-th primitive root of unity, which exists since $2n|q-1$ and $\mathbb{F}_q^*$ is a cyclic group of order q−1. It follows that $\zeta$ is also a principal root of unity since the only square roots of 1 in $\mathbb{F}_q$ are 1 and −1. It then follows that $X^n+1=(X-\zeta)(X-\zeta^3) \ldots (X-\zeta^{2n-1})$ and therefore that

5

$$NTT: \mathbb{F}_q[X]/(X^n+1) \rightarrow \prod_{i=0}^{n-1} \mathbb{F}_q[X]/(X-\zeta^{2i+1})$$

$$f \mapsto \left(f(\zeta^1), \ldots, f(\zeta^{2i+1})\right)$$

is an isomorphism by the Chinese Remainder Theorem (CRT). Clearly, the order of the product can change without repercussions, and this is often done using bit reversals to simplify implementation. The NTT transformation (i.e., $f \mapsto (f(\zeta^1), \ldots, f(\zeta^{2i+1}))$) can be computed with exactly $n/2 \cdot \log(n)$ Cooley-Tukey butterflies, and so can its inverse $NTT^{-1}$.

As described below, the NTT transformation can be computed using $n/(2m) \cdot \log(n/m)$ Cooley-Tukey butterflies, where n is the degree of the polynomial and m is some positive number, in accordance with embodiments of the invention. Thus, the computations for NTT transformations can be performed using a conventional coprocessor that is used for cryptography.

Assume that a coprocessor is an integer coprocessor with word size w bits, and q is a prime and $m=\lfloor w/(2l)\rfloor$, where l is the smallest power of two (2) larger than log q. In other words, 2l bits are reserved for each coefficient and m is the number of them that fit into a w-bit register. Let $$R_q = \frac{F_q[X]}{X^n+1}$$

be a polynomial ring such that $\mathbb{F}_q$ contains a $(2n/m)$-th root of unity $\zeta$. The main idea is to divide a polynomial $f \in R_q$ up into n/m polynomials of m coefficients each, and apply an NTT with $\zeta$ on the result.

More precisely, define the map $$\Phi: R_q \rightarrow \mathbb{F}_q[X][Y]/\left(Y-X^m, Y^{n/m}+1\right) \qquad \text{(Transformation 1)}$$

$$f = \sum_{i=0}^{n-1} f_i X^i = \sum_{j=0}^{\frac{n}{m}-1}\left(\sum_{i=0}^{m-1} f_{jm+i}X^i\right)X^{jm} \mapsto F =$$

$$\sum_{j=0}^{\frac{n}{m}-1}\left(\sum_{i=0}^{m-1} f_{jm+i}X^i\right)Y^j = \sum_{j0}^{\frac{n}{m}-1} F_j(X)Y_j,$$

where $F_j(X)=\sum_{i=0}^{m-1} f_{jm+i}X^i$ is a polynomial of degree (at most) m−1 for each j. This is an arithmetic transformation that divides an input polynomial of degree n, e.g., $f=\sum_{i=0}^{n-1} f_i X^i$, into multiple (n/m) polynomials each with m coefficients by setting $X^m=Y$. and $Y^{n/m}=-1$. As shown, the input polynomial is manipulated to extract multiples of $X^m$ from the input polynomial prior to the arithmetic transformation.

Then, an NTT (i.e., CRT) computation or transformation $$\psi: \mathbb{F}_q[X][Y]/\left(Y-X^m, Y^{n/m}+1\right) \rightarrow \qquad \text{(Transformation 2)}$$

$$\prod_{i=0}^{n/m-1} \mathbb{F}_q[X]/\left(X^m-\zeta^{2i+1}\right)$$

$$F(X, Y) \mapsto (F(X, \zeta), F\left(X, \zeta^3\right) \ldots, F\left(X, \zeta^{\frac{2n}{m}-1}\right))$$

can be done. It is noted here that Transformations 1 and 2 generalize NTTs. If m=1, then the transformations would be same as a regular NTT. This NTT is Cooley-Tukey style, as all rings in the co-domain are different. If desirable, a final transformation

6

$$\psi: \prod_{i=0}^{\frac{n}{m}-1} \mathbb{F}_q[X]/\left(X^m-\zeta^{2i+1}\right) \rightarrow \prod_{i=0}^{\frac{n}{m}-1} \mathbb{F}_q[X]/(X^m-1) \qquad \text{(Transformation 3)}$$

$$F(X, \zeta), F\left(X, \zeta^3\right)\ldots,$$

$$F\left(X, \zeta^{\frac{2n}{m}-1}\right) \mapsto (F\left(\zeta^{1/m}X, \zeta\right), F\left(\zeta^{3/m}X, \zeta^3\right)\ldots, F\left(\zeta^{\left(\frac{2n}{m}-1\right)/m}X, \zeta^{\frac{2n}{m}-1}\right))$$

can be applied to obtain Gentleman-Sande style NTT results. That is, Transformation 3 removes the variable i in the co-domain of Transformation 2, which now means that the rings in the co-domain are similar. Thus, the results of Transformation 2 are converted to another form, i.e., Gentleman-Sande style NTT results. This is only possible if the 2n-th root of unity $\zeta^{1/m}$ exists in $\mathbb{F}_q$. The inverse NTT inverts these maps.

The NTT in accordance with embodiments of the invention is further described using an example. In this example, let $f=\sum_{i=0}^{7} f_i X^i$ in $F_q[X]/(X^8+1)$ (i.e., n=8), and suppose that one register can handle 4 coefficients (i.e., m=4) simultaneously (e.g., w=128 and log q=12). Then $$F = \Phi(f) = \left(f_0 + f_1 X + f_2 X^2 + f_4 X^3\right) + \left(f_4 + f_5 X + f_6 X^2 + f_7 X^3\right)Y$$

with $Y=X^4$ is first computed using Transformation 1. Since arithmetic modulo $Y^2+1=X^8+1$ is performed, one (1) level of NTT in Y is applied. That is, F is evaluated at the roots of unity±i. This leads to the following expressions using Transformation 2.

$$\left(f_0 + f_1 X + f_2 X^2 + f_4 X^3\right) + \left(f_4 + f_5 X + f_6 X^2 + f_7 X^3\right)i, \qquad \text{(Expression 1)}$$

$$\left(f_0 + f_1 X + f_2 X^2 + f_4 X^3\right) - \left(f_4 + f_5 X + f_6 X^2 + f_7 X^3\right)i. \qquad \text{(Expression 2)}$$

These expressions require addition and subtraction of w-bit words, and multiplication of a word by a constant root of unity. Additionally, each of the coefficients has to be reduced modulo q (unless lazy reduction is used), which can be done in parallel for each of the m coefficients per word. Note that Expressions 1 and 2 are equal to $f$ mod $(X^4-i)$ and $f$ mod$(X^4+i)$, showing that this is indeed a 1-level NTT via CRT. Moreover, multiplication with another element in NTT domain can now be done with Kronecker using a single-register integer multiplication. Note that the multiplication is modulo $Y-i=X^4-i$ and $Y+i=X^4+i$, so it requires a more involved reduction. To reduce all of them to $X^4-1$, the Gentleman-Sande construction needs to be used and the coefficients within words are multiplied with appropriate powers of the 16-th root of unity $i^{1/4}$.

Let's now take the same example except that one register of the coprocessor can only handle two (2) coefficients simultaneously (e.g., w=64). Then $$f = (f_0 + f_1 X) + f(f_2 + f_3 X)i + \left((f_2 + f_3 X)Y^2 + (f_6 + f_7 X)Y^3\right)$$

with $Y=X^2$ is instead first computed using Transformation 1. Since arithmetic modulo $Y^4+1=X^8-1$, two (2) levels of NTT in Y are applied. The first NTT level reduces mod $Y^2-i$ and $Y^2+i$ leading to $(f_0 + f_1X) + (f_4 + f_5X)i + ((f_2 + f_3X) + (f_6 + f_7X)i)Y,$  (Expression 3)

$(f_0 + f_1X) - (f_4 + f_5X)i + ((f_2 + f_3X) - (f_6 + f_7X)i)Y.$  (Expression 4)

This requires additions/subtractions with registers, and two (2) multiplications of a constant with a register. The second NTT level reduces mod Y+z, Y−z, Y+iz and Y−iz (where $z^2=i$) and gives $(f_0 + f_1X) + (f_4 + f_5X)i - (f_2 + f_3X)z - (f_6 + f_7X)iz,$  (Expression 5)

$(f_0 + f_1X) + (f_4 + f_5X)i + (f_2 + f_3X)z + (f_6 + f_7X)iz,$  (Expression 6)

$(f_0 + f_1X) - (f_4 + f_5X)i - (f_2 + f_3X)iz - (f_6 + f_7X)z,$  (Expression 7)

$(f_0 + f_1X) - (f_4 + f_5X)i + (f_2 + f_3X)iz + (f_6 + f_7X)z.$  (Expression 8)

Again the resulting four (4) polynomials are modulo $X^2+z$, $X^2-z$, $X^2+iz$ and $X^2-iz$.

In accordance with embodiments of the invention, the NTT is performed with a Cooley-Tukey style computation, which involves a recursive divide-and-conquer algorithm that calculates N-element transform by recursively calculating smaller transforms and combining the outputs in a butterfly manner, i.e., by executing butterfly operations. Whereas a standard NTT performs n/2·log (n) butterfly operations, the NTT in accordance with embodiments of the invention performs only n/(2m)·log(n/m) (where m=1 is just a basic NTT) butterfly operations.

NTT in accordance with an embodiment of the invention can be computed using a w-bit coprocessor with the following Algorithm 1.

---

Algorithm 1: NTT with w-bit coprocessor in $F_q[X]/(X^n + 1)$

Input: Polynomial $f = \sum_{j=0}^{\frac{n}{m}-1} F_jX^{jm} \in = \frac{\mathbb{F}_q[X]}{X^n + 1}$ where $F_j = \sum_{i=0}^{m-1} f_{jm+i}X^i$ Output: NTT(f)
1:    k ← 1
2:    l ← n/(2m)
3:    while l > 0 do
4:        s ← 0
5:        while s < n/m do
6:            j ← s
7:            while j < s + l do
8:                t ← $F_{j+l} \cdot \zeta^{brv(k)}$ mod q    ▶ {brv = bit reversal}
9:                $F_{j+l}$ ← $F_j$ − t
10:                $F_{j+l}$ ← $F_j$ + t
11:                j ← j + 1
12:            k ← k + 1
13:            s ← j + 1
14:        l ← [l ÷ 2]

---

In the above algorithm, lines 8-10 correspond to butterfly operations. Here, brv (k) is the bit-reversal of k, where k is a log (n/m)-bit integer. It should be noted that the output of Algorithm 1 requires some reordering (replacing $F_j$ with $F_{brv(j)}$) to be completely compatible with the CRT but is otherwise equivalent.

Note that Algorithm 1 only requires 1-word coprocessor operations. However, in some cases it is more efficient to process more words simultaneously. Not only can coprocessors have reduced latency for multi-word instructions, it is also very helpful for parallelizing necessary input/output (I/O) from and to the coprocessor. Thus, the following Algorithm 2 is also described. Algorithm 2 can be seen as a more detailed Algorithm 1, where lines 9-13 of Algorithm 2 computes the mod q, and lines 14-16 of Algorithm 2 perform butterfly operations.

---

Algorithm 2: NTT with w-bit co-pro in $\mathbb{F}_q[X](X^n + 1)$-wide operations with $\overline{F}_j = [F_j], \ldots , F_{j+l-1}]$, b a sufficiently large power of two (2) and $M_b$ an appropriate bitmask.

Input: Polynomial $f = \sum_{j=0}^{\frac{n}{m}-1} F_jX^{jm} \in = \frac{\mathbb{F}_q[X]}{X^n + 1}$ where $F_j = \sum_{i=0}^{m-1} f_{jm+i}X^i$ Output: NTT(f)
1: k ← 1
2: l ← n/(2m)
3: while l > 0 do
4: s ← 0
5: while s < n/m do
6:     $T_s$ ← $\overline{F_{s+l}} \cdot \zeta^{brv(k)}$    ▶ (1 × 1) - word multiplication
7:     k ← k + 1
8:     s ← s + 2l
9:     $[t_0, t_{2l}, \ldots , t_{n/m-2l}]$ ← $[T_0, T_{2l}, \ldots , T_{n/m-2l}]$ AND $M_b$
10:     $[t_0, t_{2l}, \ldots , t_{n/m-2l}]$ ← $[t_0, t_{2l}, \ldots , t_{n/m-2l}] \cdot$ q'
11:     $[t_0, t_{2l}, \ldots , t_{n/m-2l}]$ ← $[t_0, t_{2l}, \ldots , t_{n/m-2l}]$ AND $M_b$
12:     $[T_0, T_{2l}, \ldots , T_{n/m-2l}]$ ← $[t_0, t_{2l}, \ldots , t_{n/m-2l}] \cdot$ q' + $[T_0, T_{2l}, \ldots , T_{n/m-2l}]$
13:     $[T_0, T_{2l}, \ldots , T_{n/m-2l}]$ ← $[T_0, T_{2l}, \ldots , T_{n/m-2l}] \gg 32$
14:     $[t_0, t_{2l}, \ldots , t_{n/m-2l}]$ ← 2q − $[T_0, T_{2l}, \ldots , T_{n/m-2l}]$ 15:     $\left[\overline{F_l}, F_{3l}, \ldots , F_{\frac{n}{m}-l}\right]$ ← $\left[\overline{F_l}, F_{3l}, \ldots , F_{\frac{n}{m}-l}\right]$ + $[t_0, t_{2l}, \ldots , t_{n/m-2l}]$ ▶ n/(2m) - word subtraction 16:     $\left[\overline{F_l}, F_{3l}, \ldots , F_{\frac{n}{m}-l}\right]$ ← $\left[\overline{F_l}, F_{3l}, \ldots , F_{\frac{n}{m}-l}\right]$ + $[T_0, T_{2l}, \ldots , T_{n/m-2l}]$ ▶ n/(2m) - word addition 17:    l ← l + 2l In the above Algorithm 2, exactly $n/(2ml)(l\times1)$-word multiplications with roots of unity are performed at each layer. After the multiplication, a Montgomery reduction is required, which can be performed on all multiplications simultaneously. This is done in lines 9-13 of Algorithm 2, using six (6) linear operations of $n/(2m)$ words each. To avoid borrows in the subtraction, we subtract the result from 2q in line 14 is subtracted. Finally, the addition and subtraction are performed. The total cost is therefore $n/(2m)(l\times1)$-word multiplications and nine (9) linear operations of $n/(2m)$ words. Note that this will be much more efficient on some coprocessors, but requires more storage for temporary values.

The three most obvious candidates of cryptographic applications for NTT in accordance with embodiments of the invention are (1) Kyber algorithm with q=3329, log(q)=12 and n=256, (2) Dilithium algorithm with q=8380417, log(q)=23 and n=256, and (3) Saber algorithm with q=25166081, log(q)=25 and n=256. NTT in accordance with embodiments of the invention can also be applied to Nth Degree Truncated Polynomial Ring Units (NTRU) cryptosystem and LAC algorithm.

For Kyber, l=32 can be chosen, while for Dilithium and Saber, l=64 can be chosen. This means that for w=128, NTT requires greater than four (4) times fewer butterflies for Kyber, and greater than two (2) times fewer butterflies for Dilithium and Saber.

Note that compatibility with Kyber and Dilithium requires a little more work. The matrix generation step in Dilithium samples elements in an 8-layer NTT domain, while Algorithm 1 and Algorithm 2 perform only 8–log m layers. If m>1, then additional layers have to be computed. Unlike in Algorithm 1 and Algorithm 2, the operations of these final layers are performed on coefficients that are in the same coprocessor registers (e.g., half-words for m=2 and quarters for m=4), so some efficiency is lost. Similarly, for Kyber, the matrix elements are generated in an 8-layer NTT domain, while Algorithm 1 and Algorithm 2 perform only 8–log m layers, so additional layers are necessary for m=2. On the other hand, no final layers are necessary for Saber, NTRU and LAC. As the performance of the final layers is not necessarily optimal on a coprocessor whose word size is larger than the size of the coefficients, it might be more efficient to perform them directly on the central processing unit (CPU) instead. Whether performance is better on the CPU or the coprocessor will highly depend on context.

Efficiency estimates is now described using an example of Algorithm 2 for Dilithium, where n=256 and q=8380417, and m=2. In this example the NTT on the coprocessor has 7 layers, and performs:

Layer 0:1 multiplication of 64×1 words.
Layer 1:2 multiplications of 32×1 words.
Layer 2:4 multiplications of 16×1 words.
Layer 3:8 multiplications of 8×1 words.
Layer 4:16 multiplications of 4×1 words.
Layer 5:32 multiplications of 2×1 words.
Layer 6:64 multiplications of 1×1 words.

Moreover, at each layer, it performs nine (9) linear operations on exactly sixty-four (64) words. Assuming no I/O overhead and each operation takes exactly 1 cycle per word, the total cost would be approximately $7\cdot(64+9\cdot64)$ =4480 cycles. The total number of instructions performed on the coprocessor is one hundred twenty-seven (127) multiplications plus sixty-three (63) linear operations. If each instruction has a calling overhead of two (2) cycles, the total number of cycles would increase to $4480+2\cdot190=4860$. Note that the number of coprocessor instructions in Algorithm 1 is $7\cdot64+7\cdot9\cdot64=4480$, giving an overhead of 8960 cycles (2 cycles per instruction). This demonstrates the huge benefit of Algorithm 2 over Algorithm 1 when there is overhead in calling instructions.

It is important to remark that the cost will strongly depend on the coprocessor. In many cases it might be possible to combine various operations (e.g., multiply-and-accumulate) or perform masks for free. This could reduce the cost of 9 linear operations to far below that.

Turning now to FIG. 1, an electronic device 100 in which embodiments of the invention can be implemented is shown. The electronic device 100 includes a main processor (e.g., a central processing unit (CPU)) 102, system memory 104 and a coprocessor 106. The electronic device 100 may include other electronic components depending on the cryptographic operations executed in the device. As used herein, a cryptographic operation is any operation using cryptography. Thus, as an example, cryptographic operations include, but not limited to, generating secret keys and public keys, creating digital signatures, verifying digital signatures, encrypting digital messages and decrypting digital messages.

The main processor 102 can be any type of a processor, such as a CPU commonly found in a computer system. The system memory 104 is volatile memory used for retrieving codes, such as Algorithm 1 or 2, from non-volatile memory (not shown) and processing data. The system memory 104 may include, for example, one or more random access memory (RAM) modules. The system memory 104 can be used to store instructions 105 for executing methods in accordance with embodiments of the invention described herein. The coprocessor 106 can be any type of a coprocessor, such as an arithmetic or integer coprocessor designed for classical public-key cryptography. The coprocessor 106 includes one or more registers of size w and supports the following operations for positive integers l: $(lw\times lw)\rightarrow lw$-bit addition. $(lw\times lw)\rightarrow lw$-bit subtraction, $(lw\times lw)\rightarrow lw$-bit multiplication; left/right shift operations, and/w-bit masks (ANDs).

NTT in accordance with embodiments of the invention, as described above, may be completely or partially performed by the coprocessor 106. Thus, the coprocessor 106 may perform Transformation 1 for a given input polynomial, Transformation 2 for the multiple polynomials resulting from Transformation 2, and/or Transformation 3 for the transformed polynomials resulting from Transformation 2. In some embodiments, the main processor 102 may perform at least some of the calculations needed for Transformations 1, 2 and/or 3.

Figure 2:
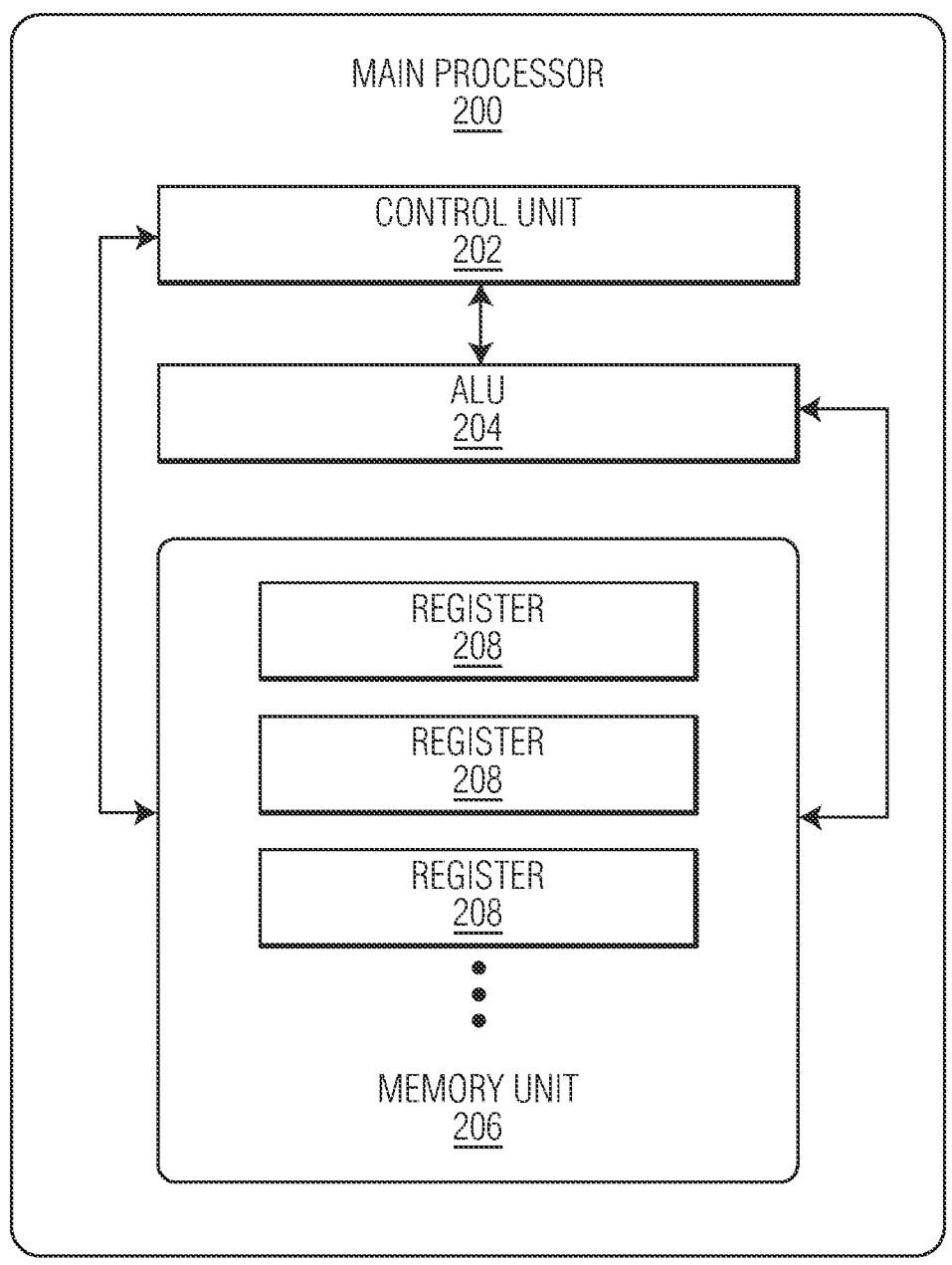
FIG. 2 is a block diagram of a main processor that may be used in the electronic device shown in FIG. 1.

Turning now to FIG. 2, an example of a main processor 200, which can be a central processing unit (CPU), that may be used in the electronic device 100 is illustrated. As shown in FIG. 2, the main processor 200 includes a control unit 202, an arithmetic and logic unit (ALU) 204 and a memory unit 206, which has multiple registers 208. The control unit 202 operates to control and coordinate the overall functioning of the various components of the electronic device 100. The control unit controls the flow of data between the components during processing using stored instructions. The ALU 204 operates to perform all the necessary mathematical operations, such as additions, subtractions, multiplications and divisions. The ALU 204 also performs all the necessary logical operations, such as testing values to determine whether the values are true or false, as well as comparative analysis, such as less than, greater than and equal to or not analyses.

The memory unit 206 is used to store data before the data is processed and to store the results after the data has been processed. Thus, for example, if two sets of data are being multiplied, both data sets are placed in the registers 208 of the memory unit 206 and multiplied by the ALU 204, and then the multiplication results are stored in another register of the memory unit. The registers 208 are accessed using unique memory addresses.

Figure 3:
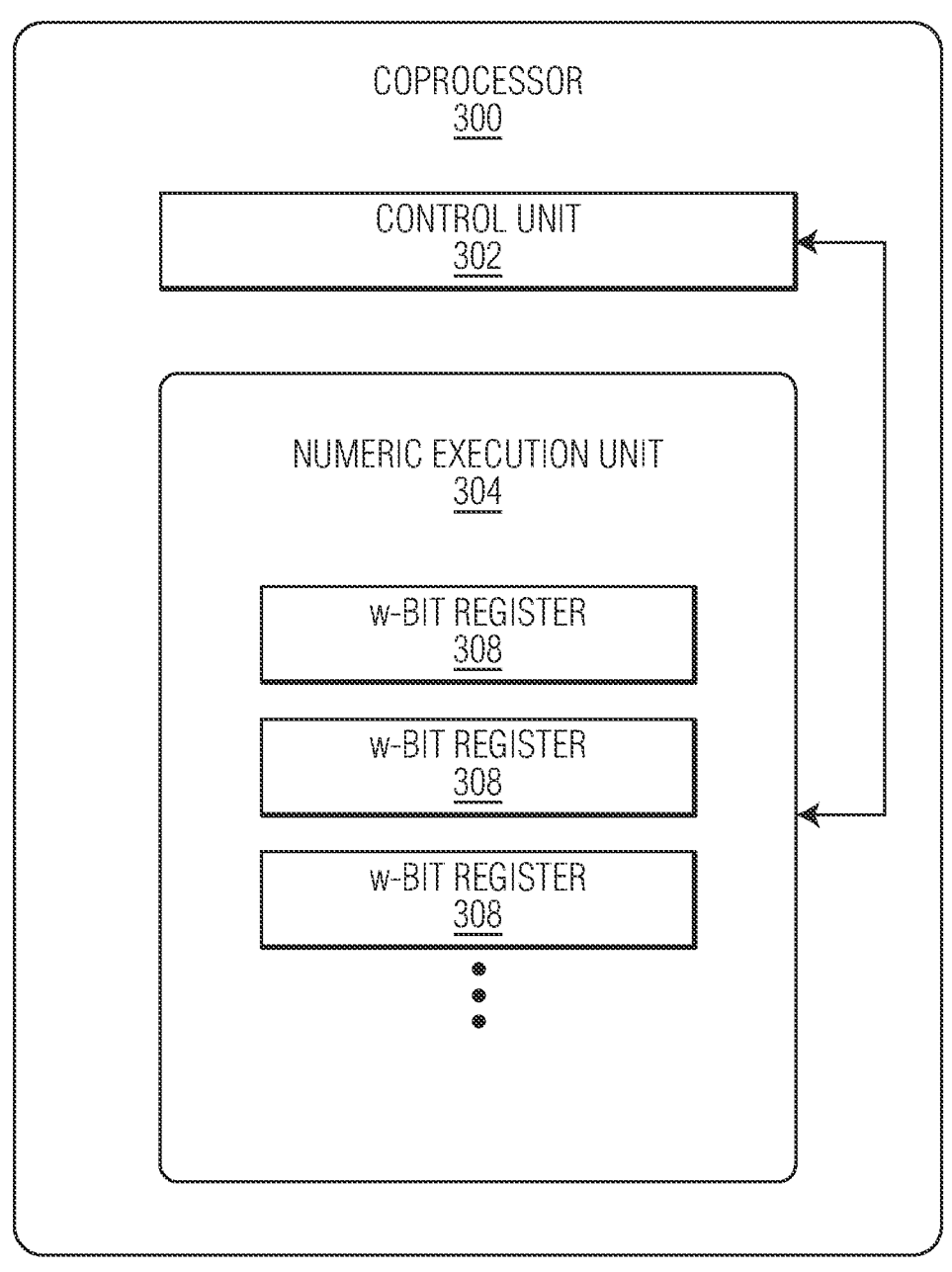
FIG. 3 is a block diagram of a coprocessor that may be used in the electronic device shown in FIG. 1.

Turning now to FIG. 3, an example of a coprocessor 300 that may be used in the electronic device 100 is illustrated. As shown in FIG. 3, the coprocessor 300 includes a control unit 302 and a numeric execution unit 304, which has multiple registers 308 that are similar to the registers 208 of the main processor 200. The control unit 302 operates to synchronize the operation between the main processor, e.g., the main processor 200, and the coprocessor 300. The control unit 302 controls the instruction execution for which the numeric execution unit 304 is responsible. The numeric execution unit 304 operates to perform all operations that access and manipulate the numeric data in the registers 308. Thus, the numeric execution unit 304 can perform mathematical operations using the registers 308 similar to the ALU 204 of the main processor 200 using the registers 208. The registers 308 can be of any size. In some implementations, the registers 308 are w-bit registers. These registers 308 are accessed using unique memory addresses.

Figure 4:
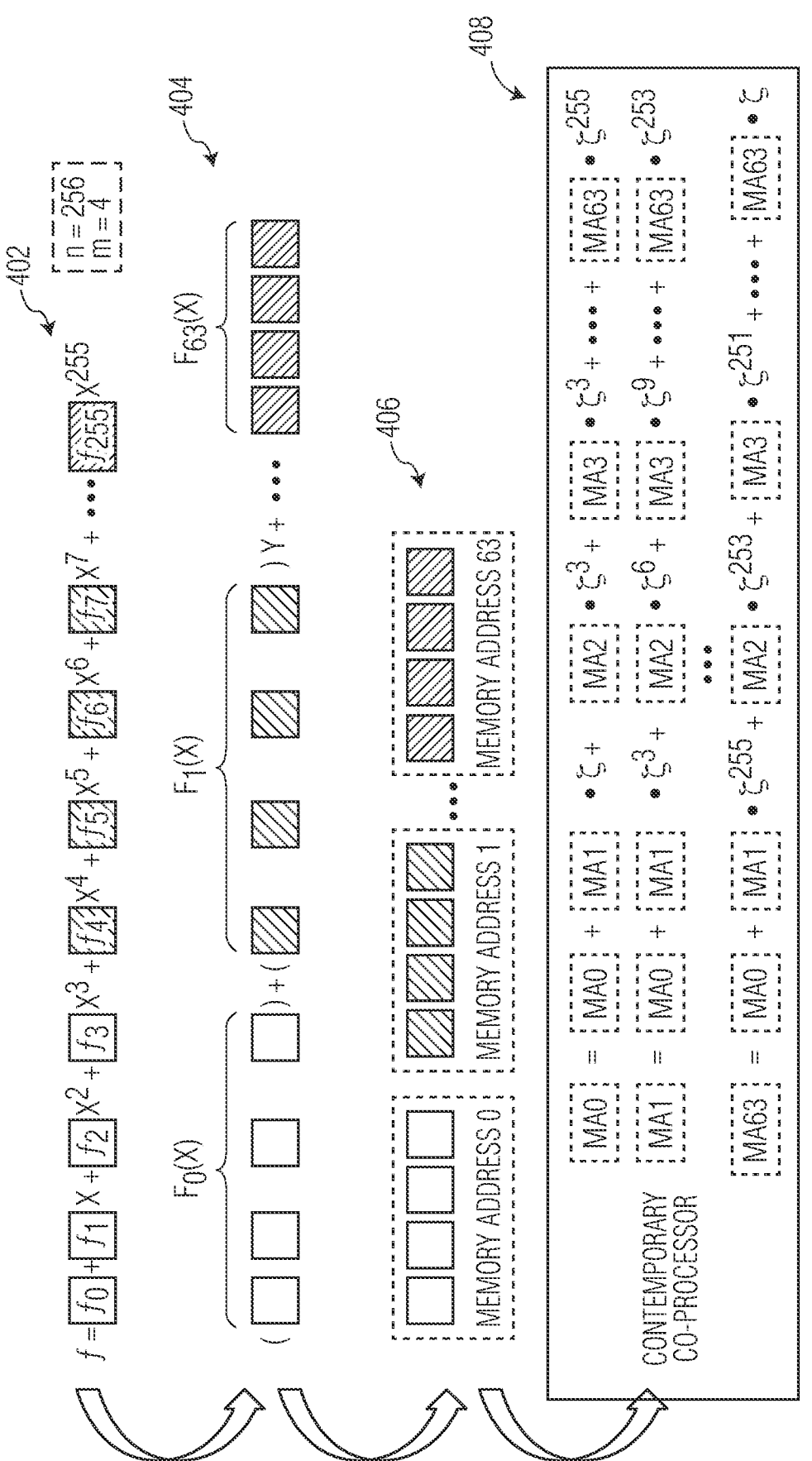
FIG. 4 illustrates a process of computing a number theoretic transform (NTT) using n=256 and m=4 in accordance with an embodiment of the invention.

As mentioned above, an NTT can be computed in accordance with embodiments of the invention using a coprocessor, such as the coprocessor 300 with the w-bit registers 308. The process of computing an NTT in accordance with an embodiment of the invention is illustrated in FIG. 4 using n=256 and m=4. The process starts in state 402, where 256 coefficients of an input polynomial function $f=\Sigma_{i=0}^{n-1}f_iX^i$ are stored in the registers of a coprocessor, such as the w-bit registers 308 of the coprocessor 300. The input polynomial function is then transformed into new multiple polynomial functions, i.e., $F_0(X), F_1(X) \ldots F_{63}(X)$, using Transformation 1 so that the 256 coefficients of the input polynomial function are reduced to 63 coefficients of the new multiple polynomial functions, as illustrated in state 404. The coefficients of each of these new multiple polynomial functions are able to be stored or placed in a single w-bit register. That is, the coefficients of each of these new multiple polynomial functions are represented by w bits. The coefficients of each of these new multiple polynomial functions are stored in one of the w-bit registers, such as the w-bit registers 308 of the coprocessor 300, as illustrated in state 406. The coefficients of these new multiple polynomial functions are then processed by the numeric execution unit of the coprocessor, such as the numeric execution unit 304 of the coprocessor 300 or any other contemporary coprocessor, to execute NTT computations on the coefficients of the new multiple polynomial functions, as illustrated in state 408. The NTT computations includes arithmetic operations, such as additions and multiplications.

A computer-implemented process for performing NTTs on polynomials for cryptography in accordance with embodiments of the invention is now described with reference to a flow diagram of FIG. 5. The process begins at step 502, where digital representation of an input polynomial with n coefficients is loaded into memory of a processor, which may be a main processor or a coprocessor, such as the main processor 200 or the coprocessor 300, where n is a positive integer. In an embodiment, the input polynomial is $f=\Sigma_{i=0}^{n-1}f_iX^i$, which is element of $$R_q = \frac{F_q[X]}{X^n + 1}.$$

The input polynomial may be generated by the main processor or the coprocessor. The coefficients of the input polynomial may be in a data structure storing n values, where each value represents a corresponding integer coefficient of the input polynomial.

Next, at step 504, the digital information representing the input polynomial is loaded from the memory of the processor to registers of the processor. Next, at step 506, an arithmetic transformation is executed on the digital information representing the input polynomial in the registers of the processor to divide the input polynomial into multiple polynomials each with less than n coefficients such that the coefficients of the multiple polynomials add up to n. In an embodiment, the arithmetic transformation is executed on the input polynomial using Translation 1.

Next, at step 508, an NTT transformation is executed on the multiple polynomials in the registers of the processor such that the coefficients of each of the multiple polynomials are processed in parallel butterfly operations. In an embodiment, the NTT transformation is executed on the multiple polynomials using Translation 2.

Next, at optional step 510, an additional transformation on the results of the NTT transformation is executed so that all rings in the co-domain are similar. In an embodiment, this additional transformation is executed on the results of the NTT transformation using Translation 3.

Next, at step 512, the results of the NTT transformation are loaded into the memory of the processor. Next, at step 514, a cryptographic operation based on the results of the NTT transformation or on the results of the additional transformation is performed. The results of the NTT transformation or the results of the additional transformation may be produced as a vector output having integer values. The cryptographic operation can be any operation using cryptography. As an example, the cryptographic operation may be a secret or public key generating operation, a digital signature creating or verifying operation, or an encryption or decryption of a digital message.

A computer-implemented process for performing number theoretic transforms (NTTs) on polynomials for cryptography in accordance with embodiments of the invention is now described with reference to a flow diagram of FIG. 6. At block 602, a data structure storing n values is received by a coprocessor. Each value represents a corresponding integer coefficient of an input polynomial function of an independent variable. At block 604, the data structure is segmented into m segments having bit-lengths that are equal to a word length of the coprocessor using an arithmetic transformation of the input polynomial function into multiple polynomial functions. Each segment stores n/m values of the data structure. At block 606, a recursive divide-and-conquer butterfly computation is performed, in registers of the coprocessor having the word length of the coprocessor, using each of the segments to produce a vector output having integer values corresponding to a number theoretic transform of the data structure. At block 608, a cryptographic operation is performed based on vector output.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It can also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performing number theoretic transforms (NTTs) on polynomials for cryptography, the method comprising:

receiving, by a coprocessor, a data structure storing n values, each value representing a corresponding integer coefficient of an input polynomial function of an independent variable;

segmenting the data structure into m segments having bit-lengths that are equal to a word length w of the coprocessor using an arithmetic transformation of the input polynomial function into multiple polynomial functions, each segment storing n/m values of the data structure;

performing, in registers of the coprocessor having the word length w of the coprocessor, a recursive divide-and-conquer butterfly computation using each of the segments m to produce a vector output having integer values corresponding to a number theoretic transform (NTT) of the data structure; and performing, by the coprocessor, a cryptographic operation based on the vector output; and wherein the cryptographic operation comprises one or more of generating secret keys, generating public keys, creating digital signatures, verifying digital signatures, encrypting digital messages, and decrypting digital messages.

2. The method of claim 1, wherein the number of the multiple polynomial functions is M=n/m, where n is the number of coefficients for each of the multiple polynomial functions.

3. The method of claim 2, wherein m equals the word length w divided by 2l, where l is the smallest power of two larger than log q and q is a prime number.

4. The method of claim 3, wherein the input polynomial function is $f = \Sigma_{i=0}^{n} f_i X^i$ in a ring $R_q = F_q[X]/(X^n+1)$.

5. The method of claim 2, wherein the coefficients of each of the multiple polynomial functions fit in a w-bit register of the coprocessor.

6. The method of claim 2, wherein the input polynomial function includes a variable X and wherein the arithmetic transformation includes replacing $X^m$ in the input polynomial function with a variable Y.

7. The method of claim 6, wherein performing the recursive divide-and-conquer butterfly computation includes executing the following transformation:

$$F(X, Y) \mapsto (F(X, \zeta), F(X, \zeta^3) \ldots , F(X, \zeta^{\frac{2n}{m}-1})),$$

where $\zeta$ is a root of unity for F (X, Y).

8. The method of claim 1 further comprising executing a transformation on the vector output to convert the vector output to Gentleman-Sande style NTT results.

9. A non-transitory computer-readable storage medium containing program instructions for performing number theoretic transforms (NTTs) on polynomials for cryptography, wherein execution of the program instructions by one or more processors of a computer causes the one or more processors to perform a method comprising:

receiving, by a coprocessor, a data structure storing n values, each value representing a corresponding integer coefficient of an input polynomial function of an independent variable;

segmenting the data structure into m segments having bit-lengths that are equal to a word length w of the coprocessor using an arithmetic transformation of the input polynomial function into multiple polynomial functions, each segment storing n/m values of the data structure;

performing, in registers of the coprocessor having the word length w of the coprocessor, a recursive divide-and-conquer butterfly computation using each of the segments to produce a vector output having integer values corresponding to a number theoretic transform of the data structure; and performing a cryptographic operation based on the vector output; and wherein the cryptographic operation comprises one or more of generating secret keys, generating public keys, creating digital signatures, verifying digital signatures, encrypting digital messages, and decrypting digital messages.

10. The non-transitory computer-readable storage medium of claim 9, wherein the number of the multiple polynomial functions is M=n/m, where n is the number of coefficients for each of the multiple polynomial functions.

11. The non-transitory computer-readable storage medium of claim 10, wherein m equals the word length w divided by 2l, where l is the smallest power of two larger than log q and q is a prime number.

12. The non-transitory computer-readable storage medium of claim 11, wherein the input polynomial function is $f = \Sigma_{i=0}^{n} f_i X^i$ in a ring $R_q = F_q[X]/(X^n+1)$.

13. The non-transitory computer-readable storage medium of claim 10, wherein the coefficients of each of the multiple polynomial functions fit in a w-bit register of the coprocessor.

14. The non-transitory computer-readable storage medium of claim 10, wherein the input polynomial function includes a variable X and wherein the arithmetic transformation includes replacing $X^m$ in the input polynomial function with a variable Y.

15. The non-transitory computer-readable storage medium of claim 14, wherein performing the recursive divide-and-conquer butterfly computation includes executing the following transformation:

$$F(X, Y) \mapsto (F(X, \zeta), F(X, \zeta^3) \, \ldots \, , F\left(X, \zeta^{\frac{2n}{m}-1}\right)),$$

where $\zeta$ is a root of unity for F(X, Y).

16. The non-transitory computer-readable storage medium of claim 9, wherein the steps further comprise executing a transformation on the vector output to convert the vector output to Gentleman-Sande style NTT results.

17. An electronic device comprising:

memory; and at least one processor, including a coprocessor, configured to:

receive, by the coprocessor, a data structure storing n values, each value representing a corresponding integer coefficient of an input polynomial function of an independent variable;

segment, by the coprocessor, the data structure into m segments having bit-lengths that are equal to a word length w of the coprocessor using an arithmetic transformation of the input polynomial function into multiple polynomial functions, each segment storing n/m values of the data structure;

perform, in registers of the coprocessor having the word length w of the coprocessor, a recursive divide-and-conquer butterfly computation using each of the segments to produce a vector output having integer values corresponding to a number theoretic transform of the data structure; and perform, by the coprocessor, a cryptographic operation based on the vector output; and wherein the cryptographic operation comprises one or more of generating secret keys, generating public keys, creating digital signatures, verifying digital signatures, encrypting digital messages, and decrypting digital messages.

18. The electronic device of claim 17, wherein the number of the multiple polynomial functions is M=n/m, where n is the number of coefficients for each of the multiple polynomial functions.

19. The electronic device of claim 18, wherein m equal the word length w divided by 2l, where l is the smallest power of two larger than log q and q is a prime number.

20. The electronic device of claim 19, wherein the input polynomial function is $f = \Sigma_{i=0}{}^n f_i X^i$ in a ring $R_q = F_q[X]/(X^n + 1)$.

\* \* \* \* \*